(12) United States Patent
Jeong et al.

(10) Patent No.: US 8,835,051 B2
(45) Date of Patent: *Sep. 16, 2014

(54) NEGATIVE ACTIVE MATERIAL FOR RECHARGEABLE LITHIUM BATTERY, METHOD FOR PREPARING SAME, AND RECHARGEABLE LITHIUM BATTERY INCLUDING SAME

(75) Inventors: Goo-Jin Jeong, Yongin-si (KR);
Min-Sook Sung, Yongin-si (KR);
Sang-Min Lee, Yongin-si (KR);
Yong-Mook Kang, Yongin-si (KR);
Wan-Uk Choi, Yongin-si (KR);
Sung-Soo Kim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 1344 days.

This patent is subject to a terminal disclaimer.

(21) Appl. No.: 12/053,417

(22) Filed: Mar. 21, 2008

(65) Prior Publication Data

US 2008/0248389 A1    Oct. 9, 2008

(30) Foreign Application Priority Data

Apr. 5, 2007   (KR) .................. 10-2007-0033742

(51) Int. Cl.
*H01M 4/134* (2010.01)
*H01M 10/0525* (2010.01)
*H01M 4/38* (2006.01)
*H01M 4/1395* (2010.01)

(52) U.S. Cl.
USPC ............... 429/218.1; 429/231.95; 429/220; 429/231.6

(58) Field of Classification Search
CPC ................................ H01M 4/134; H01M 4/40

USPC ..................... 429/218.1, 220, 231.6, 231.9
See application file for complete search history.

(56) References Cited

U.S. PATENT DOCUMENTS

| 5,885,381 A | 3/1999 | Mitose et al. |
| 6,265,111 B1 * | 7/2001 | Bito et al. ............... 429/231.95 |

(Continued)

FOREIGN PATENT DOCUMENTS

| CN | 1419303 A | 5/2003 |
| CN | 1614799 A | 5/2005 |

(Continued)

OTHER PUBLICATIONS

Machine Translation of Iijima JP 2005-011650, Jan. 2005.*

(Continued)

*Primary Examiner* — Jonathan Crepeau
*Assistant Examiner* — Jacob Buchanan
(74) *Attorney, Agent, or Firm* — Christie, Parker & Hale, LLP (57) ABSTRACT

Negative active materials for rechargeable lithium batteries are provided. One negative active material includes a metal matrix, and an intermetallic compound including a Si active metal and an additive metal dispersed in the metal matrix. The additive metal may be Ca, Mg, Na, K, Sr, Rb, Ba, Cs, or a combination thereof. The metal matrix may comprise Cu and Al. The negative active material may comprise a X(aM-bSi)—Y(cCu-dAl) material, where X is from about 30 to about 70 wt %, Y is from about 30 to about 70 wt %, X+Y is 100 wt %, a+b is 100 wt %, a is from about 20 to 80 wt %, b is from about 20 to 80 wt %, c+d is 100 wt %, c is from about 80 to about 95 wt %, d is from about 5 to about 20 wt %, and M may be Ca, Mg, Na, K, Sr, Rb, Ba, Cs, or a combination thereof.

14 Claims, 5 Drawing Sheets

(56) References Cited

U.S. PATENT DOCUMENTS

| | | | |
|---|---|---|---|
| 6,569,194 B1 | 5/2003 | Pelton | |
| 6,730,434 B1 | 5/2004 | Kawakami et al. | |
| 6,881,518 B2 | 4/2005 | Kaminaka et al. | |
| 7,097,938 B2 | 8/2006 | Yamada et al. | |
| 7,223,498 B2 | 5/2007 | Matsubara et al. | |
| 7,285,359 B2 | 10/2007 | Yamamoto et al. | |
| 2003/0134198 A1 | 7/2003 | Sawa et al. | |
| 2004/0033419 A1* | 2/2004 | Funabiki | 429/218.1 |
| 2004/0248011 A1* | 12/2004 | Asao et al. | 429/231.95 |
| 2005/0031957 A1 | 2/2005 | Christensen et al. | |
| 2005/0153208 A1 | 7/2005 | Konishiike et al. | |
| 2006/0040182 A1 | 2/2006 | Kawakami et al. | |
| 2006/0121351 A1 | 6/2006 | Sato et al. | |
| 2006/0147802 A1* | 7/2006 | Yasuda et al. | 429/233 |
| 2007/0122702 A1 | 5/2007 | Sung et al. | |

FOREIGN PATENT DOCUMENTS

| | | | | |
|---|---|---|---|---|
| CN | 1639889 A | 7/2005 | | |
| CN | 1842932 A | 10/2006 | | |
| CN | 1930726 A | 3/2007 | | |
| EP | 1 028 476 A1 | 8/2000 | | |
| JP | 59-020971 | 2/1984 | | |
| JP | 2000-311681 | 11/2000 | | |
| JP | 2001-15102 | 1/2001 | | |
| JP | 2001-93524 | 4/2001 | | |
| JP | 2002-093415 | 3/2002 | | |
| JP | 2003-257417 | 9/2003 | | |
| JP | 2003-272613 | 9/2003 | | |
| JP | 2004-006206 | 1/2004 | | |
| JP | 2004-095469 | 3/2004 | | |
| JP | 2004-296412 | 10/2004 | | |
| JP | 2004-311429 | 11/2004 | | |
| JP | 2005011650 A * | 1/2005 | | H01M 4/38 |
| JP | 2005-078999 | 3/2005 | | |
| JP | 2005-085526 | 3/2005 | | |
| JP | 2005-100876 | 4/2005 | | |
| JP | 2005-116390 | 4/2005 | | |
| JP | 2005-203343 | 7/2005 | | |
| JP | 2005-294068 | 10/2005 | | |
| JP | 2007-149685 | 6/2007 | | |
| KR | 10-2000-0033684 | 6/2000 | | |
| KR | 10-2001-0031868 | 4/2001 | | |
| KR | 10-2001-0055503 | 7/2001 | | |
| KR | 2001-0054903 | 7/2001 | | |
| KR | 10-2004-0100058 | 12/2004 | | |
| KR | 10-2005-0090220 | 9/2005 | | |
| KR | 10-0536251 | 12/2005 | | |
| KR | 10-2007-0056323 | 6/2007 | | |
| KR | 10-2007-0056765 | 6/2007 | | |
| WO | WO 00/17949 | 3/2000 | | |
| WO | WO 00/60691 A1 | 10/2000 | | |
| WO | WO 01/52337 A1 | 7/2001 | | |
| WO | WO 02/103822 A2 | 12/2002 | | |
| WO | WO 2004/086539 | 10/2004 | | |
| WO | WO 2005/018026 A2 | 2/2005 | | |
| WO | WO 2005/048381 A1 | 5/2005 | | |
| WO | WO 2005/124901 A1 | 12/2005 | | |

OTHER PUBLICATIONS

Korean Patent Abstracts, Publication 1020010054903 A, Published Jul. 2, 2001, for Sim, et al.
Korean Patent Abstracts, Publication 1020050090220 A, Published Sep. 13, 2005, for Lee, et al.
European Search Report dated Jul. 1, 2008, for European Application No. 08153062.8, 4 pages.
European Search Report dated Mar. 20, 2008 for European Patent application 07121570., 8 pages.
U.S. Office action dated Oct. 13, 2009 for U.S. Appl. No. 11/987,135, 20 pages.
U.S. Office action dated Apr. 14, 2010, for cross reference U.S. Appl. No. 11/987,135., 15 pages.
U.S. Office action dated Jun. 21, 2011, for cross reference U.S. Appl. No. 12/050,864., 26 pages.
U.S. Office action dated Jan. 19, 2011, for cross-reference U.S. Appl. No. 12/050,864, 40 pages.
U.S. Office action dated Oct. 2, 2009, for cross reference U.S. Appl. No. 11/604,712., 14 pages.
U.S. Office action dated Apr. 21, 2010, for cross reference U.S. Appl. No. 11/604,712., 14 pages.
Japanese Office action dated Sep. 14, 2010 for Japanese Patent application 2007-164317, 2 pages.
Japanese Office action dated May 24, 2011, for Japanese Patent application 2008-073437, 3 pages.
Patent Abstracts of Japan, and English machine translation for Japanese Publication 2001-015102, listed above, 69 pages.
Patent Abstracts of Japan and English machine translation of Japanese Publication 2005-0100876, listed above, 19 pages.
Patent Abstracts of Japan and English machine translation of Japanese Publication 2005-078999, listed above, 15 pages.
Patent Abstracts of Japan and English machine translation of Japanese Publication 2005-085526, listed above, 11 pages.
Patent Abstracts of Japan and English machine translation of Japanese Publication 2005-294068, listed above, 10 pages.
English machine translation of Korean Publication 10-2007-056765, listed above, 22 pages.
U.S. Office action dated Feb. 14, 2012, for cross reference U.S. Appl. No. 12/049,136, 23 pages.
U.S. Office action dated Jun. 6, 2012, for cross reference U.S. Appl. No. 12/049,136, (19 pages).
European Search Report dated Feb. 5, 2009, for European Patent application 06124957.9, corresponding to cross reference U.S. Appl. No. 11/604,712, (7 pages).
English translation of previously cited KIPO Office action dated Aug. 31, 2009 for Korean Patent Application 10-2005-0114829, priority to cross-reference U.S. Appl. No. 11/604,712 (11 pages).
English translation of previously cited Japanese Office action dated Feb. 9, 2010, for Japanese Patent application 2006-317645, corresponding to cross reference U.S. Appl. No. 11/604,712 (3 pages).
U.S. Office action dated Sep. 10, 2013, for cross reference U.S. Appl. No. 12/049,136, (21 pages).
U.S. Office action dated Sep. 9, 2013, for cross reference U.S. Appl. No. 12/050,864, (30 pages).
U.S. Office action dated Dec. 24, 2013, for cross reference U.S. Appl. No. 12/049,136, (17 pages).
U.S. Office action dated Dec. 16, 2013, for cross reference U.S. Appl. No. 12/050,864, (23 pages).
U.S. Office action dated Feb. 20, 2014, for cross reference U.S. Appl. No. 12/050,864, (9 pages).
U.S. Office action dated Mar. 4, 2014, for cross reference U.S. Appl. No. 12/049,136 (19 pages).
Somsen, Ch., et al., *Influence of iridium on the martensitic transformation in Ni-Ti shape memory alloys*, (2004), Material Science and Engineering, vol. 378, pp. 170-174.
Fuentes, J., et al., *Phase Change Behavior of Nitinol Shape Memory Alloys*, (2002), Advanced Engineering Materials, vol. 4, No. 7, pp. 437-451.
Steckmann, H., et al., *Acoustoplastic effect in the shape memory alloy Ni-Ti-Re at ultrasonic frequency*, (1999), Ultrasonics, vol. 37, pp. 59-62.

* cited by examiner

NEGATIVE ACTIVE MATERIAL FOR RECHARGEABLE LITHIUM BATTERY, METHOD FOR PREPARING SAME, AND RECHARGEABLE LITHIUM BATTERY INCLUDING SAME

CROSS-REFERENCE TO RELATED APPLICATION

This application claims priority to and the benefit of Korean Patent Application No. 10-2007-0033742 filed in the Korean Intellectual Property Office on Apr. 5, 2007, the entire content of which is incorporated herein by reference.

BACKGROUND OF THE INVENTION

1. Field of the Invention

The present invention relates to negative active materials for rechargeable lithium batteries, methods of preparing the same, and rechargeable lithium batteries including the same.

2. Description of the Related Art

Rechargeable lithium batteries use materials that are capable of reversibly intercalating or deintercalating lithium ions as the positive and negative electrodes. Organic electrolyte solutions or polymer electrolytes may be used between the positive and negative electrodes. Rechargeable lithium batteries generate electrical energy by oxidation/reduction reactions occurring during intercalation/deintercalation of lithium ions at the positive and negative electrodes.

As positive active materials, chalcogenide compounds have been widely used. Composite metal oxides such as $LiCoO_2$, $LiMn_2O_4$, $LiNiO_2$, $LiNi_{1-x}Co_xO_2$ (0≤x≤1), $LiMnO_2$, and so on, have also been used.

Conventionally, lithium metals have been used as negative active materials for rechargeable lithium batteries. However, when using lithium metal, dendrites can form which can cause short circuits, which, in turn, can cause explosions. Therefore, carbonaceous materials, such as amorphous carbon and crystalline carbon, have recently been used as negative active materials in place of lithium metals. However, such carbonaceous materials impart irreversible capacities of from 5 to 30% during the first several cycles, which wastes lithium ions and prevents at least one active material from being fully charged and discharged. Therefore, carbonaceous negative active materials have poor energy densities.

In addition, recent research has shown that metal negative active materials such as Si, Sn, and so on, which supposedly have high capacities, impart irreversible capacity characteristics. Further, tin oxide is an alternative to carbonaceous negative active materials. However, as the metal negative active material is included at 30% or less, initial Coulomb efficiency is decreased. Further, as lithium is continuously intercalated and deintercalated to generate a lithium-metal alloy, the capacity is remarkably decreased and the capacity retention rate is remarkably deteriorated after 150 charge and discharge cycles, making it not commercially viable.

SUMMARY OF THE INVENTION

One embodiment of the present invention provides a negative active material for a rechargeable lithium battery that has high capacity, excellent cycle-life characteristics, and battery efficiency.

Another embodiment of the present invention provides a method of preparing the negative active material for a rechargeable lithium battery.

Yet another embodiment of the present invention provides a rechargeable lithium battery including the negative active material.

According to one embodiment of the present invention, a negative active material for a rechargeable lithium battery includes a metal matrix, and an intermetallic compound including a Si active metal and an additive metal, the intermetallic compound being dispersed in the metal matrix. The intermetallic compound does not react with the metal matrix, and instead remains a distinct species dispersed within the metal matrix. The intermetallic compound and the metal matrix are present in an alloy form. The intermetallic compound may be present in a nano-crystalline or amorphous state.

According to one embodiment, the intermetallic compound has an average size of about 100 nm or less. According to another embodiment, the intermetallic compound has an average size ranging from about 1 to about 100 nm.

In one embodiment, the additive metal is capable of changing the eutectic point of the intermetallic compound and the metal matrix. Nonlimiting examples of suitable additive metals include at least one selected from the group consisting of Ca, Mg, Na, K, Sr, Rb, Ba, Cs, and combinations thereof. In one embodiment, the metal matrix may include Cu and Al.

The negative active material may be represented by Formula 1.

X(aM-bSi)—Y(cCu-dAl)  Formula 1

In Formula 1, X ranges from about 30 to about 70 wt %, Y ranges from about 30 to about 70 wt %, X+Y is 100 wt %, a+b is 100 wt %, a ranges from about 20 to about 80 wt %, b ranges from about 20 to about 80 wt %, c+d is 100 wt %, c ranges from about 80 to about 95 wt %, d ranges from about 5 to about 20 wt %, and M is an additive metal capable of forming an intermetallic compound with the Si active metal and is selected from the group consisting of Ca, Mg, Na, K, Sr, Rb, Ba, Cs, and combinations thereof.

According to another embodiment of the present invention, a method of preparing a negative active material for a rechargeable lithium battery includes preparing a molten product including a Si active metal, Cu, Al, and an additive metal, and quenching the molten product at its eutectic point.

According to yet another embodiment of the present invention, a rechargeable lithium battery includes a negative electrode including the negative active material, a positive electrode including a positive active material capable of reversibly intercalating and deintercalating lithium ions, and an electrolyte.

DETAILED DESCRIPTION OF THE INVENTION

According to one embodiment of the present invention, a negative active material for a rechargeable lithium battery uses Si (which is being researched as a high-capacity negative active material). Since Si provides high battery capacity, it is being highlighted as a negative active material for rechargeable lithium batteries that require higher capacity. However, since negative active materials using Si have drastically expanded volumes, cracks can form during battery charging and discharging, thereby deteriorating the cycle life of the battery. This obstacle keeps Si from being commercially used as the negative active material in a battery.

Research has been conducted into pulverizing Si particles to address the volume expansion problem. However, Si particles are pulverized into fine particles by quenching, which requires complicated processes, such as quenching speed control, to obtain pulverized Si particles. Also, in Si—Al alloys including pulverized Si, Al reacts with lithium to thereby form a chemical compound. Thus, it is difficult to apply to a rechargeable lithium battery.

According to embodiments of the present invention, the Si active metal is nano-sized, even at low quenching speeds, and provides a negative active material for a rechargeable lithium battery that is highly flexible and physically strong.

A negative active material for a rechargeable lithium battery according to one embodiment includes a metal matrix, and an intermetallic compound including a Si active metal and an additive metal, the intermetallic compound being dispersed in the metal matrix. The intermetallic compound does not react with the metal matrix, but instead remains a distinct species dispersed within the metal matrix. The intermetallic compound and the metal matrix are present in alloy form.

The Si active metal and the additive metal react with each other to form an intermetallic compound, and the intermetallic compound is dispersed inside the metal matrix. The intermetallic compound may be present in a nano crystalline or amorphous state.

According to one embodiment, the intermetallic compound has an average size of about 100 nm or less. According to another embodiment, the intermetallic compound has an average size ranging from about 1 to about 100 nm. According to yet another embodiment, the intermetallic compound has an average size ranging from about 1 to about 50 nm. When the average size of the intermetallic compound is more than about 100 nm, cracks may occur in the negative active material due to volume expansion and shrinkage during charge and discharge.

The intermetallic compound reacts with lithium, and has excellent flexibility at room temperature. Thus, it prevents the negative active material from possible mechanical deterioration. Also, since the intermetallic compound exists in a nano-sized crystalline or amorphous form, it may prevent cracks from occurring in the negative active material during charge and discharge.

The additive metal is capable of changing the eutectic point of the intermetallic compound and the metal matrix. Nonlimiting examples of suitable additive metals include at least one selected from the group consisting of Ca, Mg, Na, K, Sr, Rb, Ba, Cs, and combinations thereof. According to one embodiment, the additive metal is Ca.

The additive metal reacts with Si particles to thereby form an intermetallic compound. However, since the intermetallic compound has excellent flexibility at room temperature, it may stably maintain the alloy structure even when lithium ions are intercalated or deintercalated.

The eutectic point is the temperature at which the elements of a molten composition simultaneously crystallize at a predetermined ratio, when the molten composition is cooled. In embodiments of the present invention, the eutectic point of an alloy including Si, Cu, and Al is changed by adding an additive metal to the alloy. As used herein, the change in the eutectic point signifies that the eutectic point moves in the direction in which the content of the intermetallic compound increases while the temperature at which the elements crystallize is maintained.

Figure 1:
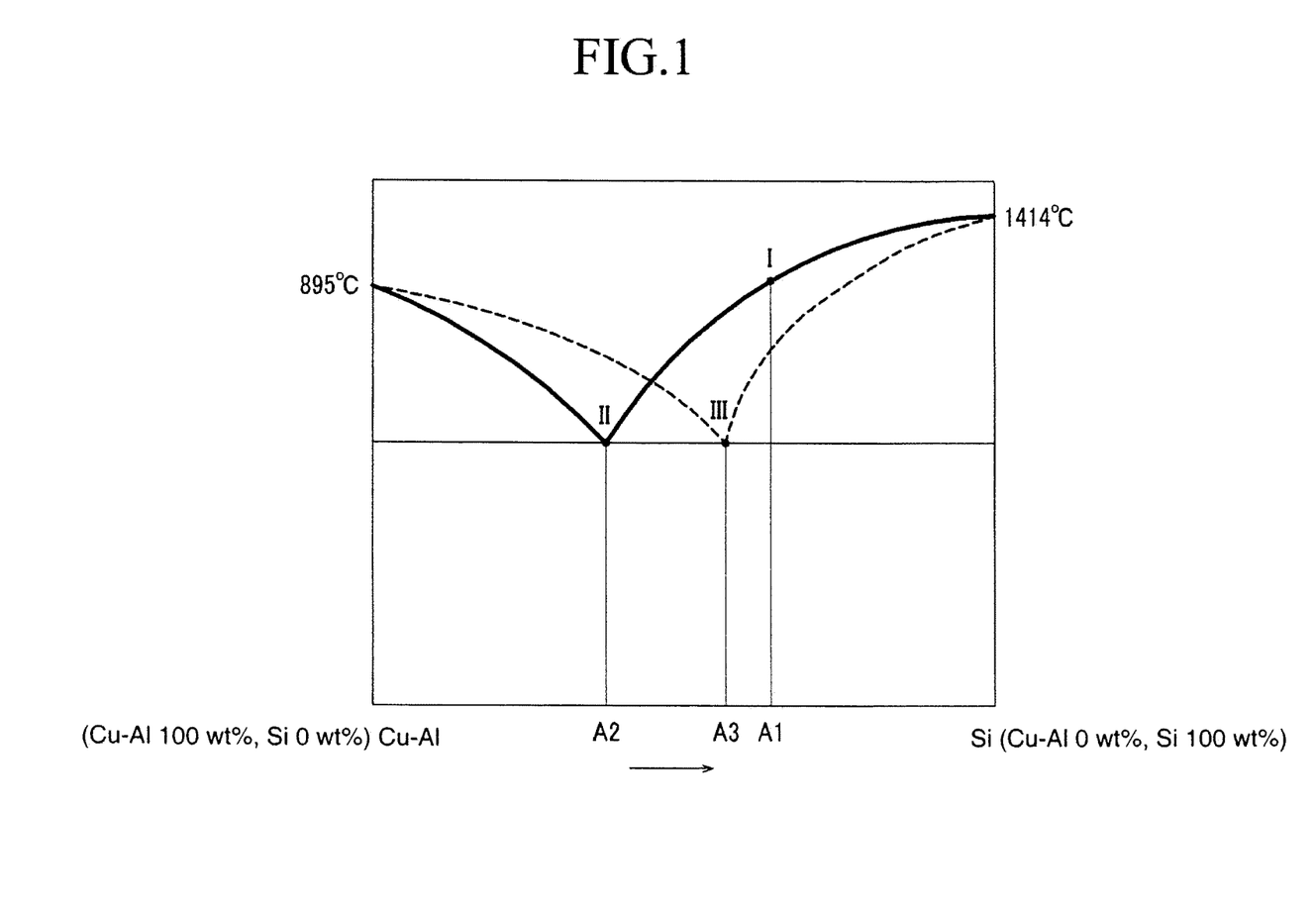
FIG. 1 is a graph showing a change in the eutectic point of a Si—Cu—Al alloy.

FIG. 1 is a graph showing a change in the eutectic point of Si—Cu—Al alloy. In the graph of FIG. 1, the x axis is the composition (wt %) of the Si—Cu—Al alloy, whereas the y axis is temperature (° C.).

Referring to FIG. 1, a liquid-phase alloy including Cu, Al, and Si active metal is cooled to a temperature I to thereby form a liquid-phase Cu—Al and crystalline Si active metal. When additional cooling is carried out, a crystalline Si—Cu—Al alloy, in which Si particles are surrounded by the Cu—Al intermetallic compound may be formed. However, the Si particles that already exist in crystalline form grow during additional quenching and become too coarse to be pulverized.

However, since Si and Cu—Al simultaneously crystallize at a temperature II, which is the eutectic point, it is possible to prepare a Si—Cu—Al alloy in which Si active metal particles are surrounded by a Cu—Al metal matrix by cooling the liquid-phase A2 composition including the Si active particles and Cu—Al down to temperature II.

Although the A2 composition may be a crystalline Si—Cu—Al alloy having finer Si active metal particles than those of the A1 composition, the A2 composition has low capacity because it includes a lesser amount of Si active metal particles than the Al composition.

An A3 composition has its eutectic point changed in the direction of the arrow by adding an additive metal to the alloy including Cu, Al and Si active metal. In short, at temperature III of the A3 composition, the content of Si active metal (x-axis) is increased compared to that of temperature II and the crystal education temperature (y-axis) is the same. Therefore, a crystalline Si—Cu—Al additive metal alloy having a high Si active metal content and fine Si active metal particles may be obtained in the A3 composition. The negative active material according to one embodiment of the present invention is based on the change in eutectic point and has large capacity, and the fine Si active metal particles are surrounded by a highly flexible metal matrix. This effectively suppresses volume expansion caused by charge and discharge, and prevents cycle-life from deteriorating even when volume is expanded.

The metal matrix includes a metal alloy that does not react with the intermetallic compound to form a chemical compound. In one embodiment, for example, the metal matrix includes Cu—Al, and in another embodiment, the metal matrix includes β-Cu—Al. When the metal matrix includes β-Cu—Al, there may be a peak at $40°≤2θ≤50°$ or $60°≤2θ≤90°$ in an X-ray diffraction intensity measurement using CuKα rays. In one embodiment, for example, there may be a peak at $42°≤2θ≤45°$. Herein, a half-width may be $0.05°≤θ≤0.5°$, and in one embodiment is $0.1°≤θ≤0.3°$.

In one embodiment, the metal matrix includes Cu and Al, which have high electric conductivity and tension, and improve electrical conductivity and mechanical safety of the metal matrix.

According to one embodiment, the negative active material may be an alloy represented by Formula 1:

In Formula 1, X ranges from about 30 to about 70 wt %, Y ranges from about 30 to about 70 wt %, X+Y is 100 wt %, a+b is 100 wt %, a ranges from about 20 to about 80 wt %, b ranges from about 20 to about 80 wt %, c+d is 100 wt %, c ranges from about 80 to about 95 wt %, d ranges from about 5 to about 20 wt %, and M is an additive metal capable of forming an intermetallic compound with the Si active metal. Nonlimiting examples of suitable additive metals include Ca, Mg, Na, K, Sr, Rb, Ba, Cs, and combinations thereof. According to one embodiment, the additive metal is Ca.

In Formula 1, the X value signifies the wt % of the intermetallic compound (α-Si) included in the negative active material, whereas the Y value signifies the wt % of the metal matrix (Cu—Al) in the alloy. Also, the a value signifies the wt % of the additive metal included in the intermetallic compound, and the b value signifies the wt % of the Si active metal that reacts with the additive metal to form the intermetallic compound. The c value signifies the wt % of Cu included in the metal matrix, and the d value signifies the wt % of Al included in the metal matrix.

According to one embodiment of the present invention, the negative active material may include the intermetallic compound in an amount ranging from about 30 to about 70 wt %, and in another embodiment, from about 40 to about 60 wt %. The negative active material may include the metal matrix in an amount ranging from about 30 to about 70 wt %, and in another embodiment, from about 40 to about 60 wt %. The negative active material may include the intermetallic compound in an amount of about 35, about 40, about 45, about 50, about 55, about 60, or about 65 wt %, and may include the metal matrix in an amount of about 35, about 40, about 45, about 50, about 55, about 60, or about 65 wt %. Within the above ranges, it is possible to prevent the negative active material from mechanically deteriorating during charge/discharge. When outside of the range, cracks may occur in the negative active material due to volume expansion caused by charge/discharge, or the particles that form the negative active material may be destroyed.

In one embodiment, the intermetallic compound may include the additive metal in an amount ranging from about 20 to about 80 wt %, and in another embodiment, from about 40 to about 60 wt %. The intermetallic compound may include the Si active metal that reacts with the additive metal to form the intermetallic compound in an amount ranging from about 20 to about 80 wt %, and in another embodiment, from about 40 to about 60 wt %. The intermetallic compound may include the additive metal in an amount of about 25, about 30, about 35, about 40, about 45, about 50, about 55, about 60, about 65, about 70, or about 75 wt %, and may include the Si active metal in an of about 25, about 30, about 35, about 40, about 45, about 50, about 55, about 60, about 65, about 70, or about 75 wt %. Within the ranges, it is possible to prevent the negative active material from mechanically deteriorating during charge and discharge. When outside of the ranges, cracks may occur in the negative active material due to volume expansion caused by charge/discharge, or the particles that form the negative active material may be destroyed.

In one embodiment, the metal matrix may include a Cu content ranging from about 80 to about 95 wt %, and in another embodiment, from about 85 to about 92 wt %. The metal matrix may include an Al content ranging from about 5 to about 20 wt %, and in another embodiment, from about 8 to about 15 wt %. Within the above ranges, it is possible to prevent the negative active material from mechanically deteriorating during charge/discharge. When outside of the ranges, cracks may occur in the negative active material due to volume expansion caused by charge/discharge, or the particles that form the negative active material may be destroyed.

Figure 2:
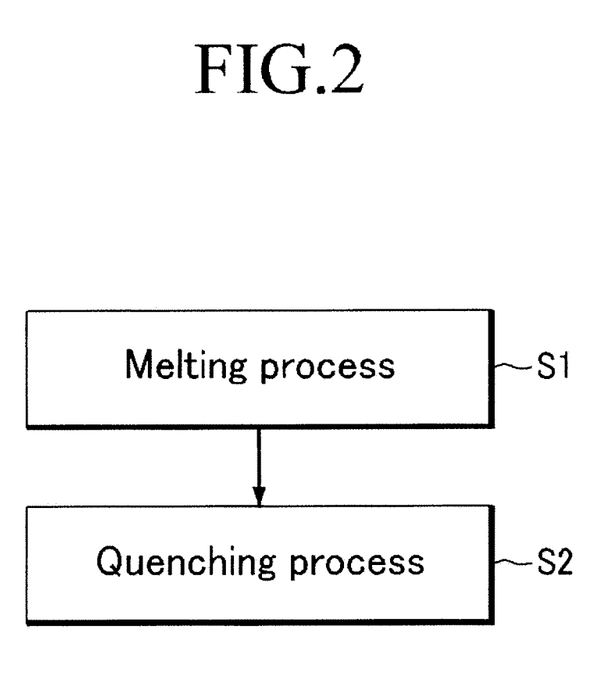
FIG. 2 is a flow chart showing preparation of a negative active material for a rechargeable lithium battery according to one embodiment of the present invention.

According to another embodiment of the present invention, the negative active material for a rechargeable lithium battery having the above structure may be prepared according to the method shown in FIG. 2. The method includes preparing a negative active material for a rechargeable lithium battery by preparing a molten product including a Si active metal, Cu, Al, and an additive metal (S1), and quenching the molten product at its eutectic point (S2).

Referring to FIG. 2, a Si active metal, Cu, Al, and an additive metal are first mixed, and then the resulting mixture is heat-treated to obtain a molten product (S1). Herein, the molten product may be prepared by heating a mixture of Si active metal, Cu, Al and an additive metal at a temperature greater than about 1000° C., and in one embodiment, at a temperature ranging from about 1200 to about 1500° C. Within the above temperature range, the liquidity of the molten product is fine and thus it is possible to acquire a high-quality rapid solidification ribbon.

Nonlimiting examples of suitable additive metals include Ca, Mg, Na, K, Sr, Rb, Ba, Cs, and combinations thereof. According to one embodiment, the additive metal is Ca.

The Si active metal and the additive metal may be mixed in a weight ratio ranging from about 80:20 to about 20:80, and in one embodiment, in a weight ratio ranging from about 40:60 to about 60:40. Within the above ratio ranges, the prepared intermetallic compound may have high flexibility so that mechanical deterioration of the negative active material may be minimized during charge and discharge. When outside of the ranges, cracks may occur in the negative active material during charge/discharge (or even when charge/discharge is not carried out), or the particles that form the negative active material may be destroyed.

Also, the Cu and Al may be included in a weight ratio ranging from about 80:20 to about 95:5, and in one embodiment, in a weight ratio ranging from about 85:15 to about 92:8. Within the ranges, the negative active material may be prevented from mechanically deteriorating during charge/discharge. When outside of the ranges, the particles that form the negative active material may be destroyed due to volume expansion caused by the charge/discharge, which is undesirable.

The Si active metal, additive metal, Cu and Al are melted through the melting process, and they form a liquid-phase Cu—Al alloy and a liquid-phase intermetallic compound that does not react with the liquid-phase Cu—Al alloy. Subsequently, the molten product is quenched to its eutectic point in step S2.

The eutectic point may range from about 800 to about 1600° C., in one embodiment from about 1100 to about 1500° C., and in another embodiment from about 1200 to about 1300° C. Within the above ranges, the nano crystalline or amorphous intermetallic compound may be formed well.

The quenching speed of the quenching process may be faster than about $10^2$ K/sec, and in one embodiment may range from about $10^2$ to about $10^7$ Ksec. When the quenching speed is lower than about $10^2$ K/sec, the nano-crystalline structure grows and may mechanically deteriorate the negative active material during charge and discharge. The faster the quenching speed, the finer the nano-crystalline structure. Thus, there is no upper limit for the quenching speed.

The negative active material prepared as above has the intermetallic compound in an amorphous or nano-crystalline state, and the intermetallic compound is surrounded by a metal matrix. In short, the intermetallic compound is dispersed within the metal matrix.

According to another embodiment, a rechargeable lithium battery including the above negative active material may include a negative electrode, a positive electrode, and an electrolyte.

The negative electrode includes a current collector and a negative active material layer disposed on the current collector. The negative active material layer includes a negative active material. The negative active material is as described above.

The negative electrode may be fabricated by mixing the negative active material, a binder, and optionally a conductive agent to provide a composition, and coating the composition on a negative current collector (such as copper) to complete the negative electrode. Negative electrode manufacturing methods are well known.

The binder binds negative active material particles to each other and also binds negative active material particles to the current collector. Nonlimiting examples of suitable binders include polyvinylalcohol, carboxymethylcellulose, hydroxypropylenecellulose, diacetylenecellulose, polyvinylchloride, polyvinylpyrrolidone, polytetrafluoroethylene, polyvinylidene fluoride, polyethylene, polypropylene, and so on.

Any electrically conductive material may be used as the conductive agent so long as it does not cause chemical change. Nonlimiting examples of suitable conductive agents include natural graphite, artificial graphite, carbon black, acetylene black, ketjen black, carbon fiber, metal powders or metal fibers including copper, nickel, aluminum, silver, and so on, polyphenylene derivatives, and combinations thereof.

The solvent may be N-methylpyrrolidone, but it is not limited thereto.

Nonlimiting examples of suitable negative current collectors include copper foils, nickel foils, stainless steel foils, titanium foils, nickel foams, copper foams, polymer substrates coated with conductive metals, and combinations thereof.

The positive electrode includes a current collector and a positive active material layer disposed on the current collector. The positive active material includes a lithiated intercalation compound that is capable of reversibly intercalating and deintercalating lithium. The positive active material includes a composite oxide including lithium and a metal, nonlimiting examples of which include cobalt, manganese, nickel, and combinations thereof. Nonlimiting examples of suitable positive active materials include those represented by Formulae 2 through 25.

$$Li_aA_{1-b}B_bD_2 \qquad \text{Formula 2}$$

In Formula 1, $0.95 \leq a \leq 1.1$ and $0 \leq b \leq 0.5$.

$$Li_aE_{1-b}B_bO_{2-c}F_c \qquad \text{Formula 3}$$

In Formula 3, $0.95 \leq a \leq 1.1$, $0 \leq b \leq 0.5$, and $0 \leq c \leq 0.05$.

$$LiE_{2-b}B_bO_{4-c}F_c \qquad \text{Formula 4}$$

In Formula 4, $0 \leq b \leq 0.5$ and $0 \leq c \leq 0.05$.

$$Li_aNi_{1-b-c}Co_bB_cD_\alpha \qquad \text{Formula 5}$$

In Formula 5, $0.95 \leq a \leq 1.1$, $0 \leq b \leq 0.5$, $0 \leq c \leq 0.05$, and $0 < \alpha \leq 2$.

$$Li_aNi_{1-b-c}Co_bB_cO_{2-\alpha}F_\alpha \qquad \text{Formula 6}$$

In Formula 6, $0.95 \leq a \leq 1.1$, $0 \leq b \leq 0.5$, $0 \leq c \leq 0.05$, and $0 < \alpha < 2$.

$$Li_aNi_{1-b-c}Co_bB_cO_{2-\alpha}F_2 \qquad \text{Formula 7}$$

In Formula 7, $0.95 \leq a \leq 1.1$, $0 \leq b \leq 0.5$, $0 \leq c \leq 0.05$, and $0 < \alpha < 2$.

$$Li_aNi_{1-b-c}Mn_bB_cD_\alpha \qquad \text{Formula 8}$$

In Formula 8, $0.95 \leq a \leq 1.1$, $0 \leq b \leq 0.5$, $0 \leq c \leq 0.05$, and $0 < \alpha \leq 2$.

$$Li_aNi_{1-b-c}Mn_bB_cO_{2-\alpha}F_\alpha \qquad \text{Formula 9}$$

In Formula 9, $0.95 \leq a \leq 1.1$, $0 \leq b \leq 0.5$, $0 \leq c \leq 0.05$, and $0 < \alpha < 2$.

$$Li_aNi_{1-b-c}Mn_bB_cO_{2-\alpha}F_2 \qquad \text{Formula 10}$$

In Formula 10, $0.95 \leq a \leq 1.1$, $0 \leq b \leq 0.5$, $0 \leq c \leq 0.05$, and $0 \leq \alpha \leq 2$.

$$Li_aNi_bE_cG_dO_2 \qquad \text{Formula 11}$$

In Formula 11, $0.90 \leq a \leq 1.1$, $0 \leq b \leq 0.9$, $0 \leq c \leq 0.5$, and $0.001 \leq d \leq 0.1$.

$$Li_aNi_bCo_cMn_dGeO_2 \qquad \text{Formula 12}$$

In Formula 12, $0.90 \leq a \leq 1.1$, $0 \leq b \leq 0.9$, $0 \leq c \leq 0.5$, $0 \leq d \leq 0.5$, and $0.001 \leq e \leq 0.1$.

$$Li_aNiG_bO_2 \qquad \text{Formula 13}$$

In Formula 13, $0.90 \leq a \leq 1.1$ and $0.001 \leq b \leq 0.1$.

$$Li_aCoG_bO_2 \qquad \text{Formula 14}$$

In Formula 14, $0.90 \leq a \leq 1.1$ and $0.001 \leq b \leq 0.1$.

$$Li_aMnG_bO_2 \qquad \text{Formula 15}$$

In Formula 15, $0.90 \leq a \leq 1.1$ and $0.001 \leq b \leq 0.1$.

$$Li_aMn_2G_bO_4 \qquad \text{Formula 16}$$

In Formula 16, $0.90 \leq a \leq 1.1$ and $0.001 \leq b \leq 0.1$.

$$QO_2 \qquad \text{Formula 17}$$

$$QS_2 \qquad \text{Formula 18}$$

$$LiQS_2 \qquad \text{Formula 19}$$

$$V_2O_5 \qquad \text{Formula 20}$$

$$LiV_2O_5 \qquad \text{Formula 21}$$

$$LiIO_2 \qquad \text{Formula 22}$$

$$LiNiVO_4 \qquad \text{Formula 23}$$

$$Li_{3-f}J_2(PO_4)_3 (0 \leq f \leq 3) \qquad \text{Formula 24}$$

$$Li_{3-f}Fe_2(PO_4)_3 (0 \leq f \leq 2) \qquad \text{Formula 25}$$

In the above Formulae 2 to 25, A is selected from Ni, Co, Mn, and combinations thereof. B is selected from Al, Ni, Co, Mn, Cr, Fe, Mg, Sr, V, rare earth elements, and combinations thereof. D is selected from O, F, S, P, and combinations thereof. E is selected from Co, Mn, and combinations thereof. F is selected from F, S, P, and combinations thereof. G is selected from Al, Cr, Mn, Fe, Mg, La, Ce, Sr, V, and combinations thereof. Q is selected from Ti, Mo, Mn, and combinations thereof. I is selected from Cr, V, Fe, Sc, Y, and combinations thereof. J is selected from V, Cr, Mn, Co, Ni, Cu, and combinations thereof.

The compound may have a coating layer on its surface, or the compound may be used after being mixed with another compound having a coating layer thereon. The coating layer may include a coating element compound selected from oxides and hydroxides of a coating element, oxyhydroxides of a coating element, oxycarbonates of a coating element, hydroxycarbonates of a coating element, and combinations thereof. The compound that forms the coating layer may be amorphous or crystalline. The coating element included in the coating layer may be at least one selected from the group consisting of Mg, Al, Co, K, Na, Ca, Si, Ti, V, Sn, Ge, Ga, B, As, Zr, and combinations thereof. The coating layer may include the aforementioned compounds and elements and may be formed by any method as long as it does not deteriorate the physical properties of the positive active material. For example the coating layer may be formed by spray coating or impregnation. Such methods are known to those skilled in the art.

The positive electrode may be fabricated by mixing the positive active material, a binder, and optionally a conductive agent in a solvent to form a positive active material composition. The positive active material composition is then applied on a positive current collector (such as aluminum) to complete the positive electrode.

One nonlimiting example of a suitable positive current collector is aluminum. One nonlimiting example of a suitable solvent is N-methylpyrrolidone.

The positive electrode manufacturing method is well known.

Any electrically conductive material may be used as a conductive agent so long as it does not cause chemical change. Nonlimiting examples of suitable conductive agents include natural graphite, artificial graphite, carbon black, acetylene black, ketjen black, carbon fiber, metal powders or metal fibers including copper, nickel, aluminum, silver, and so on, polyphenylene derivatives, and combinations thereof.

Nonlimiting examples of suitable binders include carboxymethylcellulose, hydroxypropylenecellulose, diacetylenecellulose, polyvinylchloride, polyvinylpyrrolidone, polytetrafluoroethylene, polyvinylidene fluoride, polyethylene, and polypropylene.

The solvent may be N-methylpyrrolidone, but it is not limited thereto.

The electrolyte includes a non-aqueous organic solvent and a lithium salt. The non-aqueous organic solvent acts as a medium for transmitting ions taking part in the electrochemical reaction of the battery.

The non-aqueous organic solvent may include a carbonate-based, ester-based, ether-based, ketone-based, alcohol-based, or aprotic solvent. Nonlimiting examples of suitable carbonate-based solvents include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylmethyl carbonate (EMC), ethylene carbonate (EC), propylene carbonate (PC), butylene carbonate (BC), and so on. Nonlimiting examples of suitable ester-based solvents may include n-methyl acetate, n-ethyl acetate, n-propyl acetate, dimethylacetate, methylpropionate, ethylpropionate, γ-butyrolactone, decanolide, valerolactone, mevalonolactone, caprolactone, and so on. Nonlimiting examples of suitable ether-based solvents include dibutyl ether, tetraglyme, diglyme, dimethoxyethane, 2-methyltetrahydrofuran, tetrahydrofuran, and so on. Nonlimiting examples of suitable ketone-based solvents include cyclohexanone, and so on. Nonlimiting examples of suitable alcohol-based solvents include ethyl alcohol, isopropyl alcohol, and so on. Nonlimiting examples of suitable aprotic solvents include nitriles (such as X—CN, where X is a C2 to C20 linear, branched, or cyclic hydrocarbon, a double bond, an aromatic ring, or an ether bond), amides (such as dimethylformamide), dioxolanes (such as 1,3-dioxolane), sulfolanes, and so on.

A single non-aqueous organic solvent may be used or a mixture of solvents may be used. When the organic solvent is a mixture, the mixture ratio may be controlled in accordance with the desired battery performance.

The carbonate-based solvent may include a mixture of cyclic carbonates and linear carbonates. The cyclic carbonates and the linear carbonates are mixed together in a volume ratio ranging from about 1:1 to about 1:9, and when the mixture is used as an electrolyte, electrolyte performance may be enhanced.

In addition, the electrolyte may further include mixtures of carbonate-based solvents and aromatic hydrocarbon-based solvents. The carbonate-based solvents and aromatic hydrocarbon-based solvents may be mixed together in a volume ratio ranging from about 1:1 to about 30:1.

The aromatic hydrocarbon-based organic solvent may be represented by Formula 26:

Formula 26

In Formula 26, each of $R_1$ to $R_6$ is independently selected from hydrogen, halogens, C1 to C10 alkyls, C1 to C10 haloalkyls, and combinations thereof.

Nonlimiting examples of suitable aromatic hydrocarbon-based organic solvents include benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 1,2-difluorotoluene, 1,3-difluorotoluene, 1,4-difluorotoluene, 1,2,3-trifluorotoluene, 1,2,4-trifluorotoluene, chlorotoluene, 1,2-dichlorotoluene, 1,3-dichlorotoluene, 1,4-dichlorotoluene, 1,2,3-trichlorotoluene, 1,2,4-trichlorotoluene, iodotoluene, 1,2-diiodotoluene, 1,3-diiodotoluene, 1,4-diiodotoluene, 1,2,3-triiodotoluene, 1,2,4-triiodotoluene, xylene, and combinations thereof.

The non-aqueous electrolyte may further include an additive such as vinylene carbonate or fluoroethylene carbonate for improving battery cycle-life. The additive may be used in an appropriate amount for improving cycle-life.

The lithium salt is dissolved in the non-aqueous organic solvent to supply lithium ions for the battery. The lithium salt is responsible for the basic operation of the rechargeable lithium battery, and facilitates transmission of lithium ions between positive and negative electrodes. Non-limiting examples of suitable lithium salts include $LiPF_6$, $LiBF_4$, $LiSbF_6$, $LiAsF_6$, $LiCF_3SO_3$, $LiN(SO_2C_2F_5)_2$, $Li(CF_3SO_2)_2N$, $LiC_4F_9SO_3$, $LiClO_4$, $LiAlO_2$, $LiAlCl_4$, $LiN(C_xF_{2x+1}SO_2)(C_yF_{2y+1}SO_2)$ (where x and y are natural numbers), LiCl, LiI, and lithium bisoxalate borate. The lithium salt may be used at a concentration ranging from about 0.1 to about 2.0M. When the lithium salt concentration is less than about 0.1 M, electrolyte performance may be deteriorated due to low electrolyte conductivity, whereas when the lithium salt concentration is greater than about 2.0M, lithium ion mobility may be reduced due to an increase of electrolyte viscosity.

According to one embodiment of the present invention, the rechargeable lithium battery includes a positive electrode, a negative electrode, and an electrolyte. The battery may further include a separator as needed. The separator may include any material used in conventional lithium secondary batteries. Non-limiting examples of suitable separator materials include polyethylene, polypropylene, polyvinylidene fluoride, and multi-layers thereof, such as polyethylene/polypropylene double-layered separators, polyethylene/polypropylene/polyethylene three-layered separators, and polypropylene/polyethylene/polypropylene three-layered separators.

Figure 3:
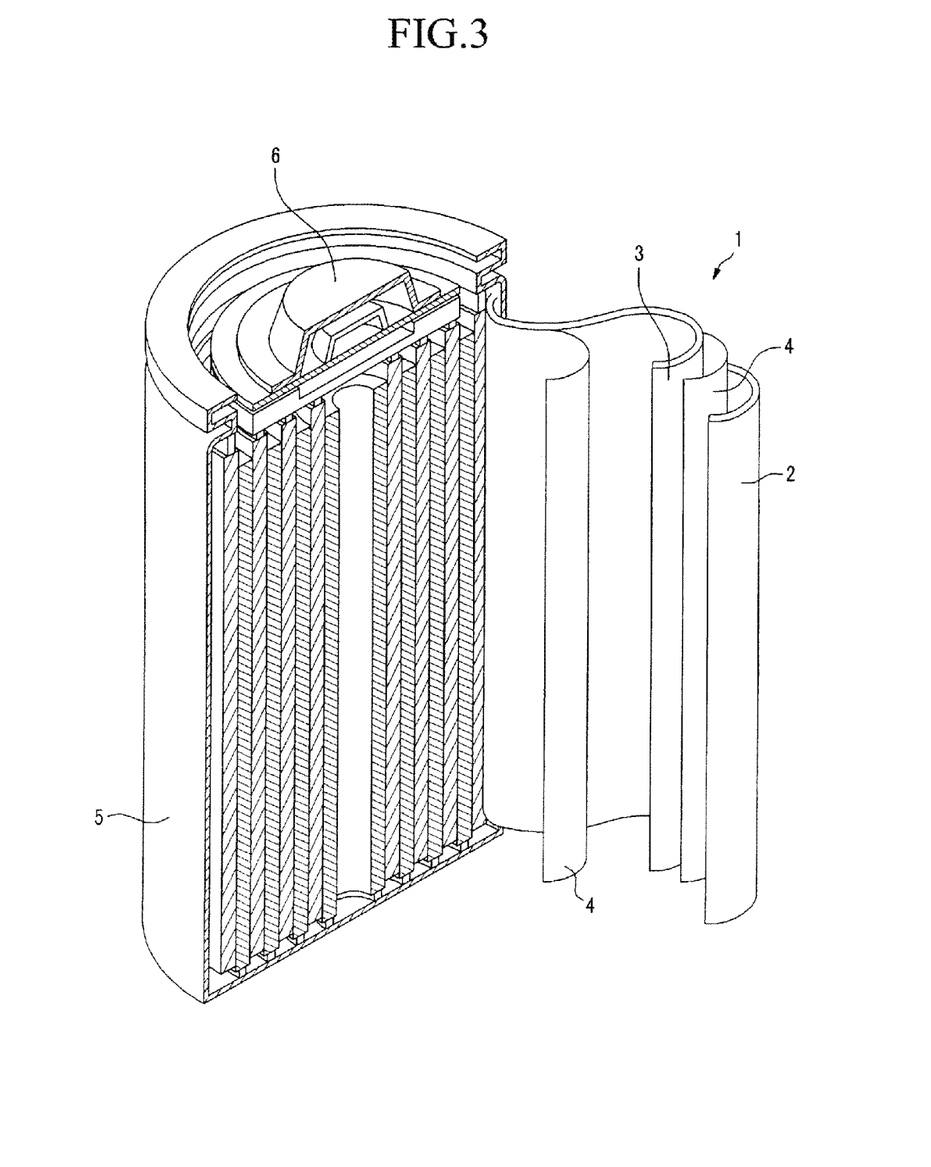
FIG. 3 is a perspective cross-sectional view of a rechargeable lithium battery according to an embodiment of the present invention.

FIG. 3 illustrates a rechargeable lithium battery having a separator according to one embodiment of the present invention. As shown in FIG. 3, the battery includes a cylindrical lithium ion cell 1, which includes a negative electrode 2, a positive electrode 4, a separator 3 between the negative electrode 2 and the positive electrode 4, an electrolyte impregnating the separator 3, a battery case 5, and a sealing member 6 sealing the battery case 5. The rechargeable lithium battery according to the present invention is not limited to the above-mentioned shape, and may be any suitable shape, such as a prism, a pouch, and so on.

The following examples are presented for illustrative purposes only and do not limit the scope of the present invention.

Example 1

A mother alloy including 34.2 wt % Si, 15.8 wt % Ca, 42.75 wt % Cu and 7.25 wt % Al was melted under an argon gas atmosphere using an arc melting method. The acquired molten product was quenched at the eutectic point of about 100° C. at a quench speed of $10^7$K/sec to thereby prepare a negative active material for a rechargeable lithium battery. The prepared negative active material was 50(31.6Ca-68.4Si)-50(85.5Cu-14.5Al).

Example 2

A 50 (31.6Ca-68.4Si)-50(85.5Cu-14.5Al) negative active material was prepared as in Example 1, except that the molten product was quenched at the eutectic point of about 1000° C. at a quench speed of $10^2$K/sec.

Example 3

A 30 (20Ca-80Si)-70(80Cu-20Al) negative active material was prepared as in Example 1, except that the mother alloy included 24 wt % Si, 6 wt % Ca, 56 wt % Cu and 14 wt % Al.

Example 4

A 30 (80Ca-20Si)-70(95Cu-5Al) negative active material was prepared as in Example 1, except that the mother alloy included 6 wt % of Si, 24 wt % of Ca, 66.5 wt % of Cu and 3.5 wt % of Al.

Example 5

A 70 (20Ca-80Si)-30(80Cu-20Al) negative active material was prepared as in Example 1, except that the mother alloy included 56 wt % of Si, 14 wt % of Ca, 24 wt % of Cu and 6 wt % of Al.

Example 6

A 60 (50Ca-50Si)-40(90Cu-10Al) negative active material was prepared as in Example 1, except that the mother alloy included 30 wt % of Si, 30 wt % of Ca, 36 wt % of Cu and 4 wt % of Al.

Comparative Example 1

A rapidly solidified ribbon-type 40Si-60Cu negative active material was prepared of an alloy including 40 wt % Si and 60 wt % Cu according to the same method as in Example 1. The negative active material contained Si active metal particles with an average size of 200 nm.

Comparative Example 2

A rapidly solidified ribbon-type negative active material was prepared of an alloy including 50 wt % Si, 42.8 wt % Cu and 7.2 wt % Al according to the same method as in Example 1. The negative active material contained Si active metal particles with an average size of 150 nm.

SEM Photograph

Figure 4A:
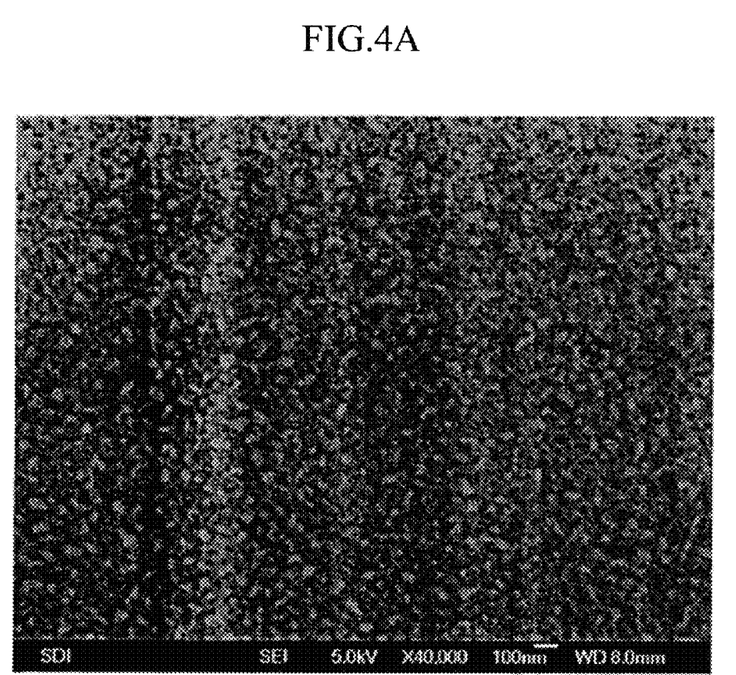
FIGS. 4A and 4B are SEM photographs of the negative active material prepared according to Example 1.
Figure 4B:
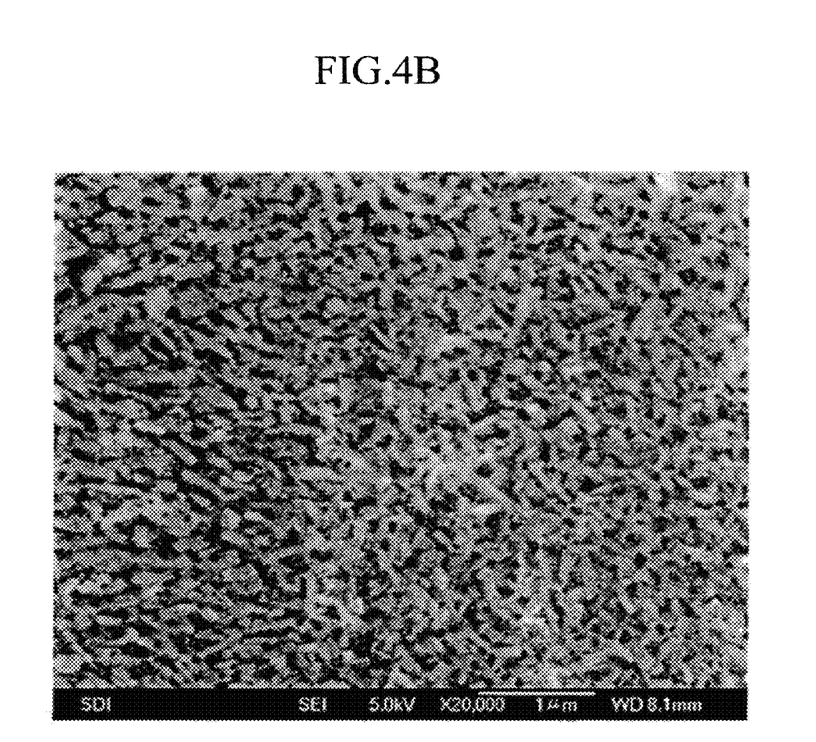

Scanning electron microscope (SEM) photographs of the negative active materials prepared according to Examples 1 to 6 were taken. SEM photographs of the negative active material prepared according to Example 1 were taken with different magnifications and are presented in FIG. 4A (×20000) and FIG. 4B (×40000). In FIGS. 4A and 4B, the bar is 1 μm. It can be seen from FIGS. 4A and 4B that the negative active material prepared according to Example 1 includes an intermetallic compound having an average particle size of 50 nm dispersed in a metal matrix.

In addition, SEM photographs showed that the negative active materials prepared according to Examples 2, 3, 4, 5, and 6 had intermetallic compounds having average particle sizes of 100 nm, 85 nm, 10 nm, 70 nm, and 1 nm, respectively, and each intermetallic compound was dispersed in a metal matrix.

Battery Performance

Each of the negative active materials according to Examples 1 and 3, and Comparative Examples 1 and 2 were used to prepare a negative active material composition. To prepare the composition the negative active material, a Super-P conductive material, and a polyimide binder were mixed in a N-methylpyrrolidone solvent at a weight ratio of 8:1:1. Using each negative active material composition, a negative electrode was fabricated by the conventional procedure. A 2016 coin-type half cell was fabricated using each negative electrode, a lithium metal counter electrode, and an electrolyte prepared by dissolving 1.0M of $LiPF_6$ in an organic solvent including a mixture of ethylene carbonate and diethyl carbonate at a volume ratio of 1:1.

The half cell was charged and discharged once at a 0.1 C rate within 5 mV to 2V to measure initial capacity and initial efficiency. For cycle-life characteristics, the half cell was charged and discharged for 100 cycles at a 0.5 C rate. The results are shown in Table 1. In Table 1, the "cycle life characteristics" are reported as the capacity at the 100th cycle as a percentage of the initial capacity.

TABLE 1

|  | Initial capacity | Initial efficiency | Cycle life characteristics |
| --- | --- | --- | --- |
| Example 1 | 800 mAh/g | 80% | 80% |
| Example 3 | 750 mAh/g | 78% | 80% |
| Comparative Example 1 | 600 mAh/g | 75% | 75% |
| Comparative Example 2 | 730 mAh/g | 75% | 60% |

As shown in Table 1, the cells according to Examples 1 and 2 exhibited good initial capacity, good initial efficiency, and significantly better cycle life characteristics. However, the cells according to Comparative Examples 1 and 2 exhibited good initial capacity and initial efficiency, but poor cycle life characteristics.

The negative active materials for rechargeable lithium batteries according to the present invention impart high capacity, and excellent cycle-life and cell efficiency.

While the present invention has been illustrated and described with reference to certain exemplary embodiments, it will be understood by those of ordinary skill in the art that various changes and modifications may be made to the described embodiments without departing from the spirit and scope of the present invention as defined by the following claims.

What is claimed is:

1. A negative active material for a rechargeable lithium battery, comprising:
   a metal matrix; and
   an intermetallic compound consisting of a Si active metal and an additive metal, the additive metal being selected from the group consisting of Ca, Mg, Na, K, Rb, Cs, and combinations thereof, the intermetallic compound having an average particle size of less than 100 nm and being dispersed in the metal matrix, wherein the intermetallic compound does not react with the metal matrix, and the intermetallic compound is present in the negative active material in an amount of about 30 to about 70 wt %.

2. The negative active material of claim 1, wherein the intermetallic compound and the metal matrix form an alloy.

3. The negative active material of claim 1, wherein the intermetallic compound is nano-crystalline or amorphous.

4. The negative active material of claim 1, wherein the intermetallic compound has an average size ranging from about 1 to about 85 nm.

5. The negative active material of claim 1, wherein the additive metal is Ca.

6. The negative active material of claim 1, wherein the metal matrix comprises Cu and Al.

7. The negative active material of claim 1, wherein the negative active material comprises a material represented by Formula 1:

$$X(aM\text{-}bSi)\text{—}Y(cCu\text{-}dAl) \quad \text{Formula 1}$$

wherein X ranges from about 30 to about 70 wt %, Y ranges from about 30 to about 70 wt %, X+Y is 100 wt %, a+b is 100 wt %, a ranges from about 20 to 80 wt %, b ranges from about 20 to 80 wt %, c+d is 100 wt %, c ranges from about 80 to about 95 wt %, d ranges from about 5 to about 20 wt %, and M is selected from the group consisting of Ca, Mg, Na, K, Rb, Cs, and combinations thereof.

8. A rechargeable lithium battery comprising:
   a negative electrode comprising:
      a negative active material comprising:
         a metal matrix; and
         an intermetallic compound consisting of a Si active metal and an additive metal, the additive metal being selected from the group consisting of Ca, Mg, Na, K, Rb, Cs, and combinations thereof, the intermetallic compound having an average particle size of less than 100 nm or less and being dispersed in the metal matrix, wherein the intermetallic compound does not react with the metal matrix, and the intermetallic compound is present in the negative active material in an amount of about 30 to about 70 wt %;
   a positive electrode including a positive active material capable of reversibly intercalating/deintercalating lithium ions; and
   an electrolyte.

9. The rechargeable lithium battery of claim 8, wherein the intermetallic compound and the metal matrix form an alloy.

10. The rechargeable lithium battery of claim 8, wherein the intermetallic compound is nano-crystalline or amorphous.

11. The rechargeable lithium battery of claim 8, wherein the intermetallic compound has an average size ranging from about 1 to about 85 nm.

12. The rechargeable lithium battery of claim 8, wherein the additive metal is Ca.

13. The rechargeable lithium battery of claim 8, wherein the metal matrix comprises Cu and Al.

14. The rechargeable lithium battery of claim 8, wherein the negative active material is represented by Formula 1:

$$X(aM\text{-}bSi)\text{—}Y(cCu\text{-}dAl) \quad \text{Formula 1}$$

wherein, X ranges from about 30 to about 70 wt %, Y ranges from about 30 to about 70 wt %, X+Y is 100 wt %, a+b is 100 wt %, a ranges from about 20 to about 80 wt %, b ranges from about 20 to about 80 wt %, c+d is 100 wt %, c ranges from about 80 to 95 wt %, d ranges from about 5 to about 20 wt %, and M is selected from the group consisting of Ca, Mg, Na, K, Rb, Cs, and combinations thereof.

* * * * *